(12) United States Patent
Katsumura et al.

(10) Patent No.: US 6,623,845 B1
(45) Date of Patent: Sep. 23, 2003

(54) GLASS-CERAMIC COMPOSITION, AND ELECTRONIC COMPONENT AND MULTILAYER LC COMPOSITE COMPONENT USING THE SAME

(75) Inventors: Hidenori Katsumura, Hyogo (JP); Ryuichi Saito, Osaka (JP); Masahiro Hiraka, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/763,109

(22) PCT Filed: Jun. 16, 1999

(86) PCT No.: PCT/JP99/03197

§ 371 (c)(1),
(2), (4) Date: Apr. 20, 2001

(87) PCT Pub. No.: WO00/76938

PCT Pub. Date: Dec. 21, 2000

(30) Foreign Application Priority Data

Mar. 17, 1998 (JP) .............................. 10-066609

(51) Int. Cl.[7] .......................... B32B 17/00; B32B 3/00; H01L 29/12; C03C 14/00
(52) U.S. Cl. ...................... 428/210; 428/433; 428/432; 428/620; 501/32; 257/499
(58) Field of Search .................... 501/32; 428/432, 428/433, 434; 257/499

(56) References Cited

U.S. PATENT DOCUMENTS 5,304,967 A * 4/1994 Hayashi ...................... 333/206

FOREIGN PATENT DOCUMENTS

| JP | 05-036531 | | 2/1993 |
| JP | 6-8189 | | 2/1994 |
| JP | 10106880 | | 4/1998 |
| JP | 11060266 | * | 3/1999 |

* cited by examiner

Primary Examiner—Deborah Jones
Assistant Examiner—G. A. Blackwell-Rudasill
(74) Attorney, Agent, or Firm—RatnerPrestia (57) ABSTRACT

A multilayer LC composite component includes a glass-ceramic composition and internal electrodes containing silver or copper as a main component. The multilayer LC composite component is outstanding in mounting reliability particularly to a resin substrate, easy to manufacture, and has excellent electric characteristics at high frequency. The glass-ceramic composition includes 45 to 35 wt. % of forsterite powder and 55 to 65 wt. % of glass composite powder, and compositions of the glass composite powder include 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$. It is high in flexural strength, moderately high in coefficient of thermal expansion, easy to use in manufacturing a greensheet, and densely sintered at a temperature of less than 950 degrees C.

12 Claims, 5 Drawing Sheets

GLASS-CERAMIC COMPOSITION, AND ELECTRONIC COMPONENT AND MULTILAYER LC COMPOSITE COMPONENT USING THE SAME

This Application is a U.S. National Phase Application of PCT International Application PCT/JP99/03197.

FIELD OF THE INVENTION

The present invention relates to a glass-ceramic composition, which can be sintered at low temperature and has high flexural strength. The invention also relates to electronic components and multilayer LC composite components using the glass-ceramic composition, these components having excellent electric characteristics at high frequency as well as excellent mounting reliability on a resin substrate, yet being easily manufactured.

BACKGROUND OF THE INVENTION

Figure 1:
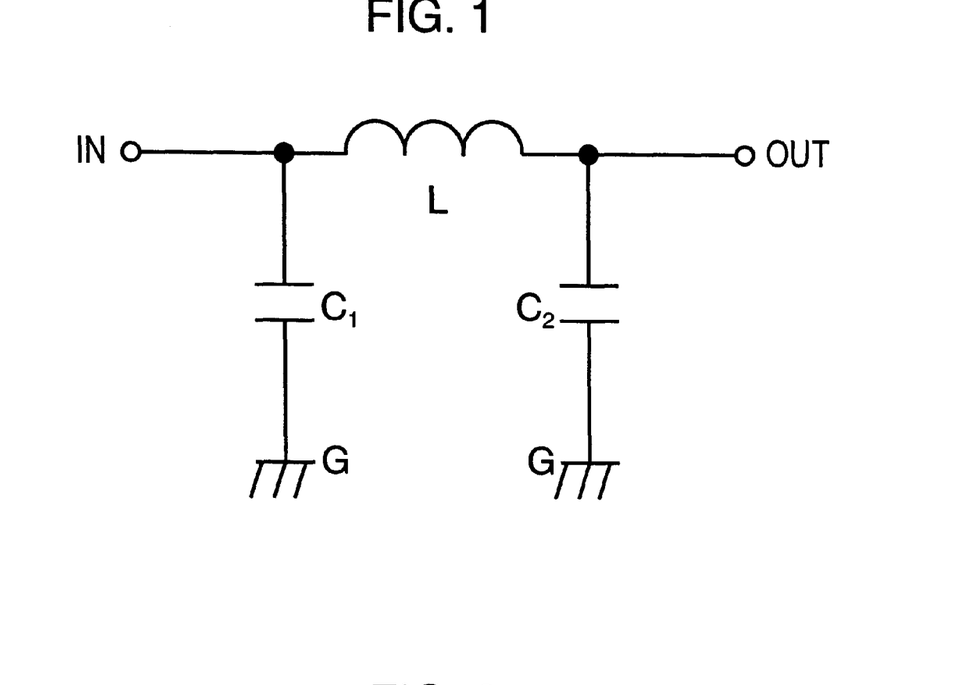
FIG. 1 is an equivalent circuit diagram of a multilayer LC composite component of an exemplary embodiment of the present invention.
Figure 2:
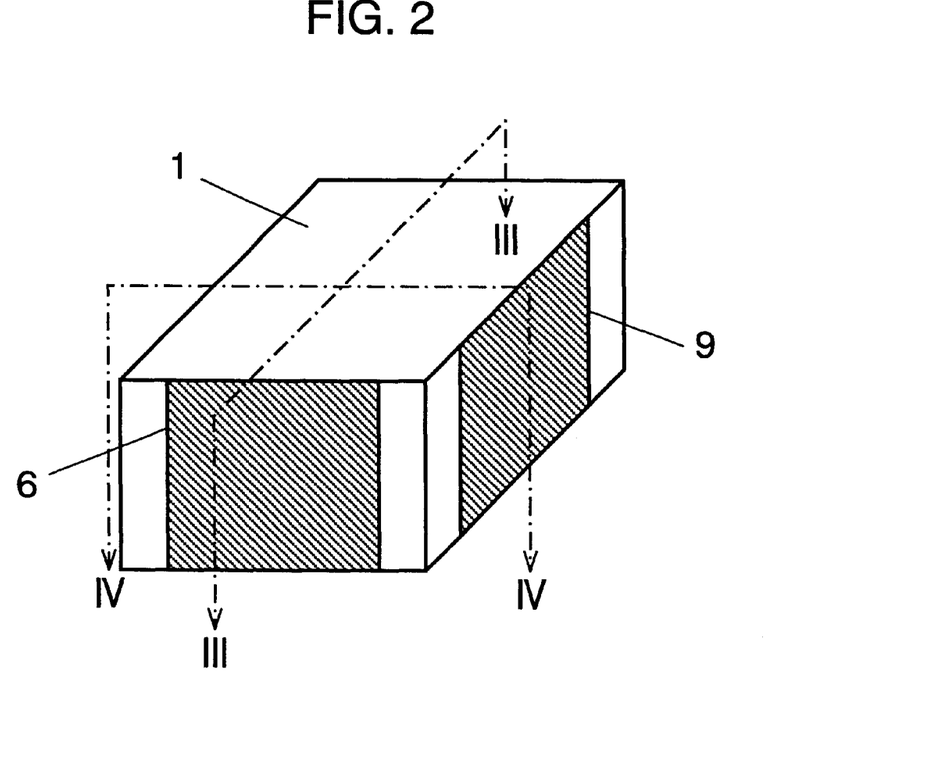
FIG. 2 is a perspective view of a multilayer LC composite component using glass-ceramic composition of an exemplary embodiment of the present invention.
Figure 3:
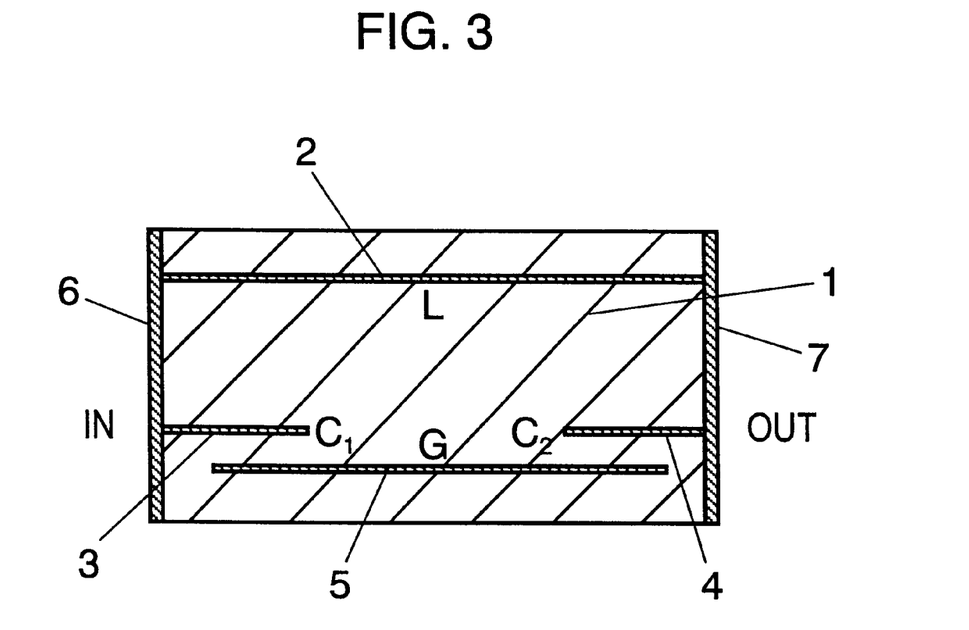
FIG. 3 is a sectional view taken along a dashed line III—III in FIG. 2.
Figure 4:
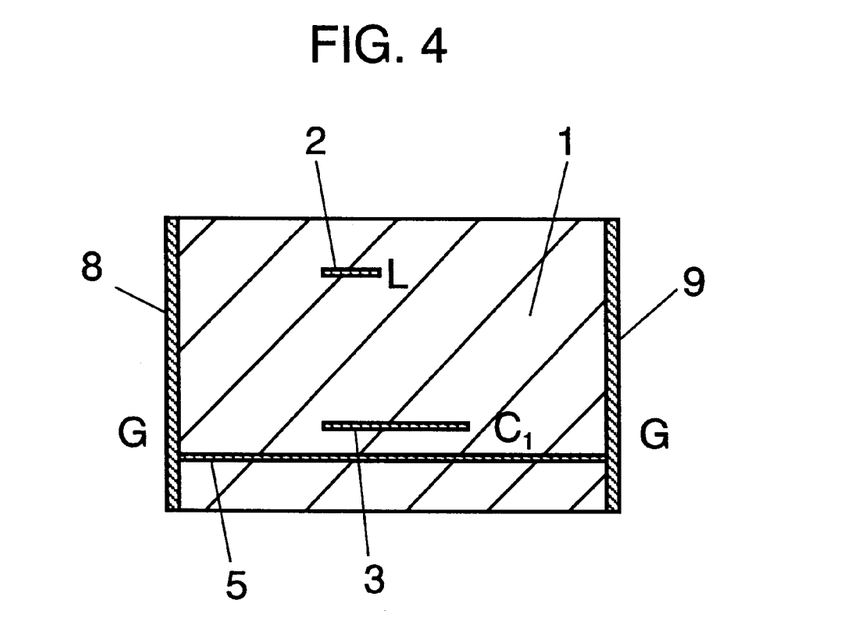
FIG. 4 is a sectional view taken along a dashed line IV—IV in FIG. 2.

With advancement of miniaturization and high frequency operation of electronic components used in the field of communications such as cellular phones, multilayer LC composite components, each carrying capacitors and coils integrated into a single component, have come to be used in late years. These multilayer LC composite components contain mutually connected capacitors and coils composed of internal electrodes provided in insulator layers constructed of glass-ceramic composition of low dielectric constant. For example, a circuit shown in FIG. 1 is composed internally as a multilayer LC composite component, as depicted in FIG. 2, FIG. 3, and FIG. 4. The multilayer LC composite component shown here is an example of low-pass filter, in which the circuit shown in FIG. 1 is obtained by forming capacitors C1 and C2, and a coil L with internal electrodes 2 through 5 provided in an insulator layer 1. Besides, there are external electrodes 6 through 9 formed on the exterior.

It is necessary to use a metal having high electrical conductivity, such as gold, silver, and copper, for the internal electrodes in order to improve a loss characteristic of multilayer LC composite components of this kind. However, since melting points of these metals are so low as approx. 960 degrees C. in the case of silver, for instance, a composition of the insulator needs to be such a material that can be fired densely even at a low temperature of around 900 degrees C. There has been developed for this purpose, a glass-ceramic composition sintered at a low temperature by mixing glass powder with ceramic powder of low dielectric constant, such as alumina ($Al_2O_3$), as a composite of insulator having a low relative dielectric constant and capable of being fired simultaneously with electrodes of high conductivity such as silver and copper.

As a nature of multilayer LC composite component, the surface area becomes wider compared to ordinary electronic component, and at the same time, it is required to be thin in height. This results in that a multilayer LC composite component tends to be large thin plate-like shaped. For this reason, a high mechanical strength is needed for an insulation body composed of glass-ceramic composition that constitutes the multilayer LC composite components. However, flexural strength of the glass-ceramic composition of the prior art is so low as less than 150 MPa in the case of a glass-ceramic composition for multilayer inductor described for instance in Japanese Patent No. 2597341, as compared with the ordinary ceramic such as alumina. In addition, there are often cases that coefficient of thermal expansion is generally so small as 7 ppm/K or less. This substantially increases a difference in coefficient of thermal expansion with respect to a substrate such as glass-epoxy resin (whose coefficient of thermal expansion is approx. 14 ppm/K in general), upon which the multilayer LC composite components are mounted, and thereby it tends to cause a defect such as a crack in an insulator layer due to a stress generated by heat in a soldering process and the like during mounting of the multilayer LC composite components on the resin substrate. According to a study of the inventors, it is desirable for the glass-ceramic composition constituting the insulator layer to have 150 MPa or greater in flexural strength and 9 ppm/K or greater in coefficient of thermal expansion in order not to reduce mounting reliability.

However, there are often cases that a softening point is lowered by adding a large amount of boric oxide ($B_2O_3$) or lead oxide (PbO) having an environmental problem, in order to make the glass-ceramic composition feasible for being fired at a low temperature around 900 degrees C. An oxide dielectric material described in Japanese Patent Examined Publication, No. H06-8189, for example, contains 4 to 12 wt. % of $B_2O_3$ in the entire glass-ceramic composition, and there is disclosed that it can not be sintered densely at 1000 degrees C. or less if the content is less than the above figure.

In the case of glass-ceramic composition with a high boric-oxide content, however, there may be instances where slurry can gelate unless water content in powder of the glass-ceramic composition is precisely controlled when mixing solvent and binder with powder of the glass-ceramic composition to turn it into the slurry in the manufacturing process of greensheets that constitute the multilayer body. This has been a big problem when forming the glass-ceramic composition that can be sintered at low temperature.

The present invention is intended to solve the above problem, and it aims at providing glass-ceramic composition and electronic components using the same, which are outstanding in mounting reliability particularly to a resin substrate since they have a large flexural strength and a moderately high coefficient of thermal expansion, and easy to manufacture because of a low content of boric oxide in the glass powder. It is also an object of the invention to provide multilayer LC composite components that are excellent in electric characteristics especially at high frequency since they carry internal electrodes of silver or copper having high electrical conductivity.

SUMMARY OF THE INVENTION

Glass-ceramic composition and an electronic component using the same of the present invention are constructed by forming and firing a mixture, which includes 55 to 65 wt. % of glass composite powder and 45 to 35 wt. % of forsterite ($Mg_2SiO_4$), wherein the glass composite powder includes 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$.

Also, another glass-ceramic composition and an electronic component using the same of the present invention are constructed by forming and firing a mixture, which includes 0.2 to 5 wt. % of oxidized copper calculated in CuO equivalent added further as a supplementary component into a 100% portion of another mixture of 50 to 65 wt. % of glass composite powder and 50 to 35 wt. % of forsterite ($Mg_2SiO_4$), wherein the glass composite powder includes 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$.

The glass-ceramic composition and the electronic components using the same, constructed as above, are outstanding in mounting reliability particularly to a resin substrate, since they have a thermal expansion coefficient of 9 ppm/K or greater and a flexural strength of 150 MPa or greater, and that they are easy to manufacture because of a low content of boric oxide in the glass powder.

Furthermore, the electronic component of the present invention has internal electrodes formed within the glass-ceramic composition described as above, the internal electrodes including at least one of gold, silver, and copper as the main component.

With the structure as described above, the electronic component of the present invention is superior in electric characteristics especially at high frequency, since it has the internal electrodes of silver or copper having high electrical conductivity.

In addition, a multilayer LC composite component of the present invention includes an insulator layer of the above-described glass-ceramic composition and internal electrodes made of silver or copper as the main component, and it further comprises a coil element formed of the internal electrodes in any configuration of a liner shape, a meander shape, and a spiral shape within the insulator layer, and a capacitor element formed of the internal electrodes confronting with each other across the insulator layer.

With the above structure, the multilayer LC composite component of the present invention is outstanding in mounting reliability particularly to a resin substrate since it has a thermal expansion coefficient of 9 ppm/K or greater and a flexural strength of 150 MPa or greater, it is easy to manufacture because of a low content of boric oxide in the glass powder, it results in a low dispersion of relative dielectric constant with respect to the firing temperature, and also it is superior in electric characteristics especially at high frequency, since it has the internal electrodes of silver or copper having high electrical conductivity.

DESCRIPTION OF THE PREFERRED EMBODIMENTS

With reference to the drawings, exemplary embodiments of the present invention will be described hereinafter.

First Exemplary Embodiment

Described first pertains to a method of composing glass-ceramic composition of the present invention and a method of evaluating each characteristic.

Oxides or carbonates and the like, each of which contains chemically highly pure (99% or higher) constituent elements (Si, Al, Ba, La, B), were used as the initiating materials. After completion of purity corrections for these initiating materials, they were weighed to be the compositions shown in Table 1, and fine powder of these materials were mixed with a zirconia cobblestone and ethanol in a ball mill for 18 hours. After the mixing, slurry was dried, melted in a platinum crucible for 3 hours at 1400 to 1500 degrees C., and cooled quickly to obtain a lump of glass. After the lump of glass was crushed coarsely, they were ground by the same method as that used for mixing the raw materials, using a ball mill, and dried to turn them into glass powder. The glass powder produced as above and forsterite powder (in a purity of 96% or higher) were weighed in the mixing ratio shown in Table 2, wet-blended and ground for 18 hours in a ball mill, and dried for 24 hours at 150 degrees C. to produce powder of the glass-ceramic composition. A mean particle diameter of the powder was approximately 1.5 micrometer according to a measurement by the laser diffraction method.

The powder obtained here was added with 20 wt. % of aqueous solution containing 5 wt. % of polyvinyl alcohol, as a binder, and blended. After the blending, it was granulated by passing it through a 32-mesh sieve, and formed into a discoidal shape of 13 mm in diameter by 1 mm in thickness, and a cylindrical shape of 5 mm in diameter by 10 mm in height respectively at 100 MPa. After the formed bodies were heated at a temperature of 600 degrees C. for 3 hours to burn off the binder, they were fired at a variety of temperatures in a range of 840 to 940 degrees C. maintained for 30 minutes. Electrodes were formed on both sides of the discoidal samples by vacuum deposition of gold-chrome, capacitance at 1 GHz were measured using an impedance analyzer, and relative dielectric constants were calculated from the diameter and the thickness of the sintered body. Coefficients of thermal expansion were measured using the cylindrical samples in a range of 50 to 300 degrees C. with a TMA meter.

A method of forming a greensheet is described next. 80 grams of butyl acetate, 15 grams of polyvinyl butyral resin and 8 grams of dibutyl phthalate were added to the glass-ceramic powder produced as described above, and mixed them in a ball mill for 48 hours to obtain slurry. Greensheets of 50 micrometer in thickness were produced from the obtained slurry by the well-known doctor blade method. Twenty-eight sheets of the greensheet were stacked and compression-bonded, and the binder was burned off by heating it for 4 hours at 400 degrees C., after it was cut into a size of 70 mm by 70 mm by 1.2 mm. The firing was maintained for 30 minutes at a temperature that produced the largest relative dielectric constant in the above measurements. They were then cut out into a size of 4 mm by 40 mm by 1 mm with a dicer, and measured of their flexural strength by the four-point weighting measurement method.

Table 2 shows relations of a relative dielectric constant, a firing temperature that results in the maximum relative dielectric constant, a flexural strength, and a coefficient of thermal expansion with respect to each of the glass-ceramic compositions obtained by mixing forsterite with glass powder having the components shown in Table 1. In Table 1 and Table 2, those marked with an asterisk are out of the scope of the present invention, and all others are within the scope of the present invention.

TABLE 1

| Sample No. of glass powder | | A | B* | C* | D* | E* | F* |
|---|---|---|---|---|---|---|---|
| Composition (wt. %) | $SiO_2$ | 45 | 42 | 45 | 45 | 45 | 45 |
| | BaO | 35 | 41 | 38 | 31 | 33 | 39 |
| | $Al_2O_3$ | 5 | 4 | 2 | 9 | 5 | 5 |
| | $La_2O_3$ | 10 | 8 | 10 | 10 | 10 | 6 |
| | $B_2O_3$ | 5 | 5 | 5 | 5 | 7 | 5 |

*Those marked by asterisk are out of scope of the claim of the present invention.

TABLE 2

| Sample No. | 1 | 2 | 3 | 4* | 5* | 6* | 7* | 8* | 9* | 10* |
|---|---|---|---|---|---|---|---|---|---|---|
| Glass powder No. | A | A | A | B* | C* | D* | E* | F* | A | A |
| Content of glass powder (%) | 60 | 55 | 65 | 60 | 60 | 60 | 60 | 60 | 67 | 53 |
| Content of forsterite (%) | 40 | 45 | 35 | 40 | 40 | 40 | 40 | 40 | 33 | 47 |
| Firing temperature (degrees C.) | 880 | 940 | 840 | 880 | 900 | >940 | 860 | >940 | 840 | >940 |
| Relative dielectric constant (at 1 GHz) | 7.0 | 6.8 | 7.4 | 7.2 | 7.1 | — | 6.8 | — | 7.5 | — |
| Thermal expansion coefficient (ppm/K.) | 9.7 | 9.9 | 9.5 | 9.7 | 9.2 | — | 9.8 | — | 9.3 | — |
| Flexural strength (Mpa) | 170 | 180 | 150 | 140 | 140 | — | Note | — | 140 | — |

*Mark: Out of scope of the claim of the present invention.
— Mark: Not measured.
>940: Not sintered sufficiently at 940 degrees C..
(Note): A test specimen for flexural strength measurement could not be made for sample No. 7, as the slurry has gelated during production of a greensheet.

All of the glass-ceramic compositions in this exemplary embodiment were fired at a temperature of 940 degrees C. or below, and such properties as relative dielectric constant of 7.5 or less, flexural strength of 150 MPa or greater, and coefficient of thermal expansion of 9 ppm/K or greater were attained.

In this exemplary embodiment, ranges of components of the glass powder that compose the glass-ceramic composition were limited for the following reason.

$SiO_2$ represents a network former of the glass, and stable glass is not obtainable if the content is less than 40 wt. %. Furthermore, the glass becomes not meltable at 1500 degrees C. if the content is more than 50 wt. %, because a softening point of the glass rises exceedingly.

BaO is an element to improve meltability of the glass, while it also has an effect of increasing a flexural strength of the sintered body, as it helps precipitate celsian crystal ($BaAl_2Si_2O_8$) around an interface between amorphous glass layer and forsterite particles during the firing. It does not melts at 1500 degrees C. or less if there is less than 30 wt. % of BaO. If it exceeds 40 wt. %, it tends to devitrify during the glass formation, thereby making the precipitation of celsian crystal uneven during the firing, and the flexural strength to decrease as in the case of sample No. 4, and therefore it is not desirable.

Like BaO, $Al_2O_3$ is also a component material of the celsian crystal and the flexural strength decreases as shown by the sample No. 5, if the content becomes less than 3 wt. %. On the other hand, sintering can not be accomplished at lower than 950 degrees C., as the sample No. 6, since the softening point becomes excessively high if there is more than 8 wt. %, and it is therefore undesirable.

$B_2O_3$ is a component that facilitates vitrification, and the glass does not melt at 1500 degrees C. if the content is less than 3 wt. %. Also, if it exceeds 6 wt. %, as in the case of sample No. 7, the slurry gelates in making a greensheet, and this is not desirable since a homogeneous greensheet can not be obtained.

$La_2O_3$ is a component for adjusting viscosity of the glass during the low-temperature firing. If the content is less than 8 wt. % as in the case of sample No. 8, the viscosity does not decrease sufficiently during the low-temperature firing, and its wettability with the forsterite powder becomes poor, and therefore densely sintered body can not be obtained at lower than 950 degrees C. Also, viscosity of the glass decreases excessively if it exceeds 12 wt. %, which is not desirable, since it causes such troubles as the sintered body sticks to parting powder, setter, and the like during firing.

Described next pertains to a reason for limiting the mixing ratio of the glass powder and the forsterite powder. If content of the glass powder increases to more than 65 wt. % like the sample No. 9, the flexural strength becomes less than 150 Mpa, and this is not desirable. If the glass powder is less than 55 wt. % as in the case of sample No. 10, it can not be sintered densely at less than 950 degrees C., and this is also not desirable.

Second Exemplary Embodiment

Next, a case was studied where oxidized copper is added as a second exemplary embodiment of the present invention. Samples were composed by weighing and mixing chemically highly pure CuO powder (99% or higher) with glass powder and forsterite powder, and their properties evaluated in the same manner as in the case of the first exemplary embodiment. Table 3 shows the results.

TABLE 3

| Sample No. | 1 | 11 | 12 | 13 | 14 | 15* | 16 | 17 | 18 | 19* |
|---|---|---|---|---|---|---|---|---|---|---|
| Glass powder No. | A | A | A | A | A | A | A | A | A | A |
| Content of glass powder (%) | 60 | 60 | 60 | 60 | 60 | 60 | 55 | 52 | 50 | 48 |
| Content of forsterite (%) | 40 | 40 | 40 | 40 | 40 | 40 | 45 | 48 | 50 | 52 |
| Additive rate of CuO (%) | 0 | 0.1 | 0.2 | 1.0 | 5.0 | 6.0 | 1.0 | 5.0 | 5.0 | 5.0 |

TABLE 3-continued

| Sample No. | 1 | 11 | 12 | 13 | 14 | 15* | 16 | 17 | 18 | 19* |
|---|---|---|---|---|---|---|---|---|---|---|
| Firing temperature (degrees C.) | 880 | 880 | 860 | 860 | 840 | 840 | 900 | 920 | 940 | >940 |
| Relative dielectric constant (at 1 GHz) | 7.0 | 7.0 | 7.1 | 7.2 | 7.4 | 7.5 | 6.9 | 6.8 | 6.8 | — |
| Thermal expansion coefficient (ppm/K.) | 9.8 | 9.8 | 9.8 | 9.8 | 9.7 | 9.7 | 10.0 | 10.2 | 10.2 | — |
| Flexural strength (MPa) | 170 | 170 | 180 | 180 | 150 | 140 | 190 | 160 | 160 | — |

Figure 5:
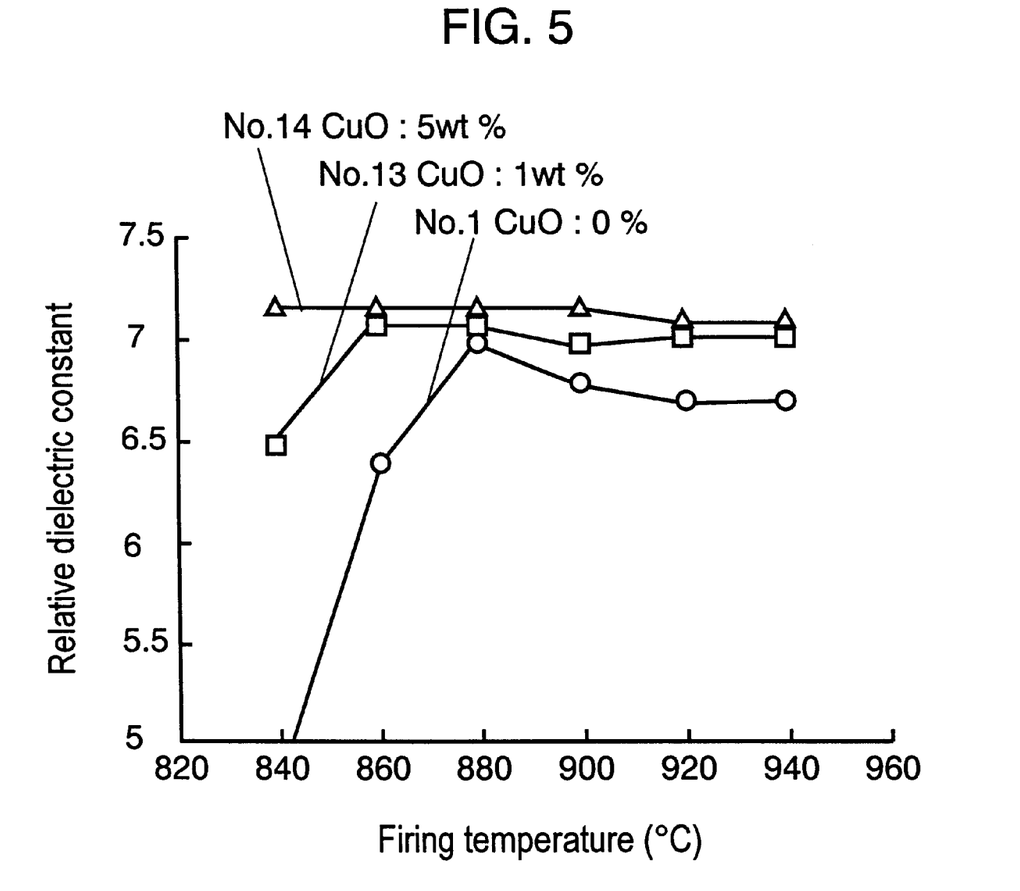
FIG. 5 is a characteristic figure showing a relation between relative dielectric constant and firing temperature when oxidized copper is added to the glass-ceramic composition of the exemplary embodiment of the present invention.

The firing temperature decreases further by adding oxidized copper by 0.2 wt. % or more. In addition, it reduces dispersion in relative dielectric constant with respect to the firing temperature as shown in FIG. 5, and thereby an improvement can be expected of yield in the mass-production.

In the case where content of the glass powder was within the range of 50 to 55 wt. %, and therefore unable to be fired at 940 degrees C., addition of the oxidized copper can make it densely fired at lower than 940 degrees C., like the samples, No. 17 and 18 in Table 3.

Furthermore, in the case where the glass powder content is 55 wt. %, the forsterite powder content is 45 wt. %, and additive rate of the oxidized copper is 1%, as represented by the sample No. 16, the firing temperature becomes 900 degrees C., and such properties can be obtained as flexural strength of 190 MPa and coefficient of thermal expansion of 10.0 ppm/K, and this is especially a desirable form.

However, it is not desirable if the additive rate of oxidized copper exceeds 5%, since the flexural strength becomes less than 150 Mpa, as in the case of sample No. 15.

In the exemplary embodiment of the present invention, although firing was made in the atmospheric environment, like properties can be obtained even if the firing is made in an atmosphere of nitrogen.

Moreover, any elements other than those already described in this exemplary embodiment may be contained so long as they do not cause an adverse effect to the properties within the scope of the present invention.

Third Exemplary Embodiment

Next, one embodied example of multilayer LC composite components, which use glass-ceramic composition of the sample No. 16, will be described as a third exemplary embodiment of the present invention.

Figure 6A:
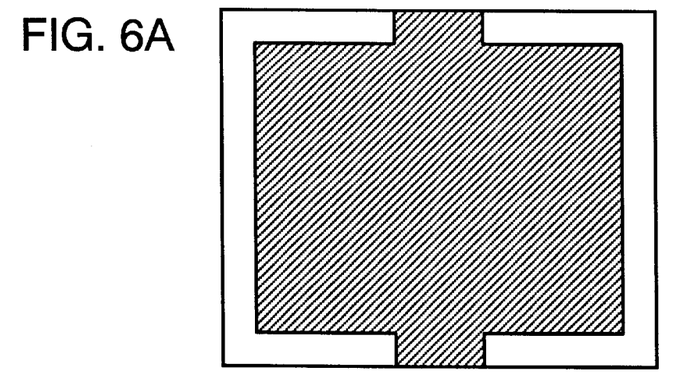
FIG. 6A is a plan view depicting a grand pattern of a multilayer LC composite component (i.e. a low-pass filter) of an exemplary embodiment of the present invention.
Figure 6B:
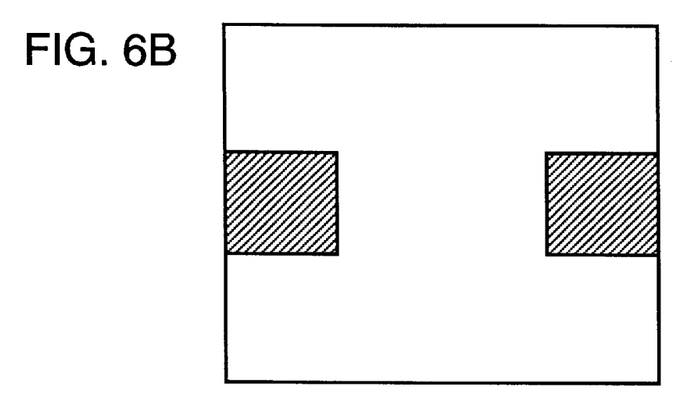
FIG. 6B is a plan view depicting a capacitor pattern of the same multilayer LC composite component.
Figure 6C:
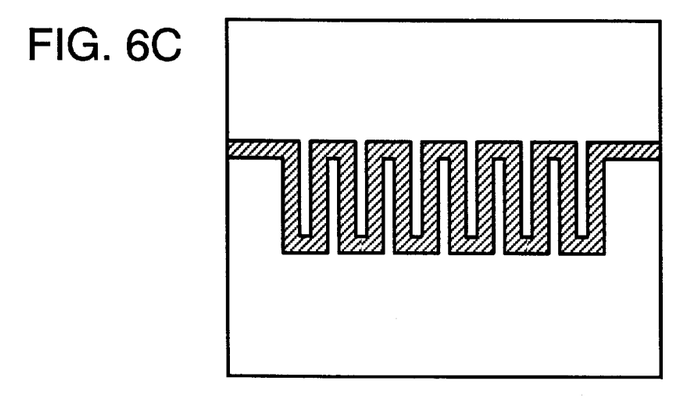
FIG. 6C is a plan view depicting a coil pattern of the same multilayer LC composite component.

Three greensheets in 50 micrometer thick representing the sample No. 16 prepared according to the second exemplary embodiment are stacked. A grand pattern shown in FIG. 6A is printed first on its surface by the well-known screen printing method using commercially available silver paste, and dried. Another greensheet is stacked on an upper surface of it, and a capacitor pattern is then printed as shown in FIG. 6B. Additionally, twenty-eight greensheets are stacked on top of the surface, and a coil pattern of a meander shape shown in FIG. 6C is printed. Finally, four greensheets are further stacked, and they are thermo-compression bonded at 40 degrees C. and a pressure of 300 kg/cm² for one minute. Multilayer products having a sectional structure, as shown in FIG. 3 and FIG. 4, can be obtained when it is cut into individual elements. Here, the print patterns were respectively designed so as to have 5.6 pF in capacitance value of both capacitors C1 and C2, and 9.7 nH in inductance value of a coil L after the firing, taking into consideration a shrinkage of the glass-ceramic composition due to the firing.

These elements were fired while maintaining 875 degrees C. for 30 minutes, after the binder was burned off with a heat treatment at 400 degrees C. in the atmospheric environment. Afterwards, commercially available silver electrode containing glass frit is coated in a desire shape on side surfaces, as external electrodes, they were baked by maintaining 750 degrees C. for 10 minutes, and multilayer LC composite components (i.e. low-pass filters) shown in FIG. 2, FIG. 3, and FIG. 4, were obtained.

Figure 7:
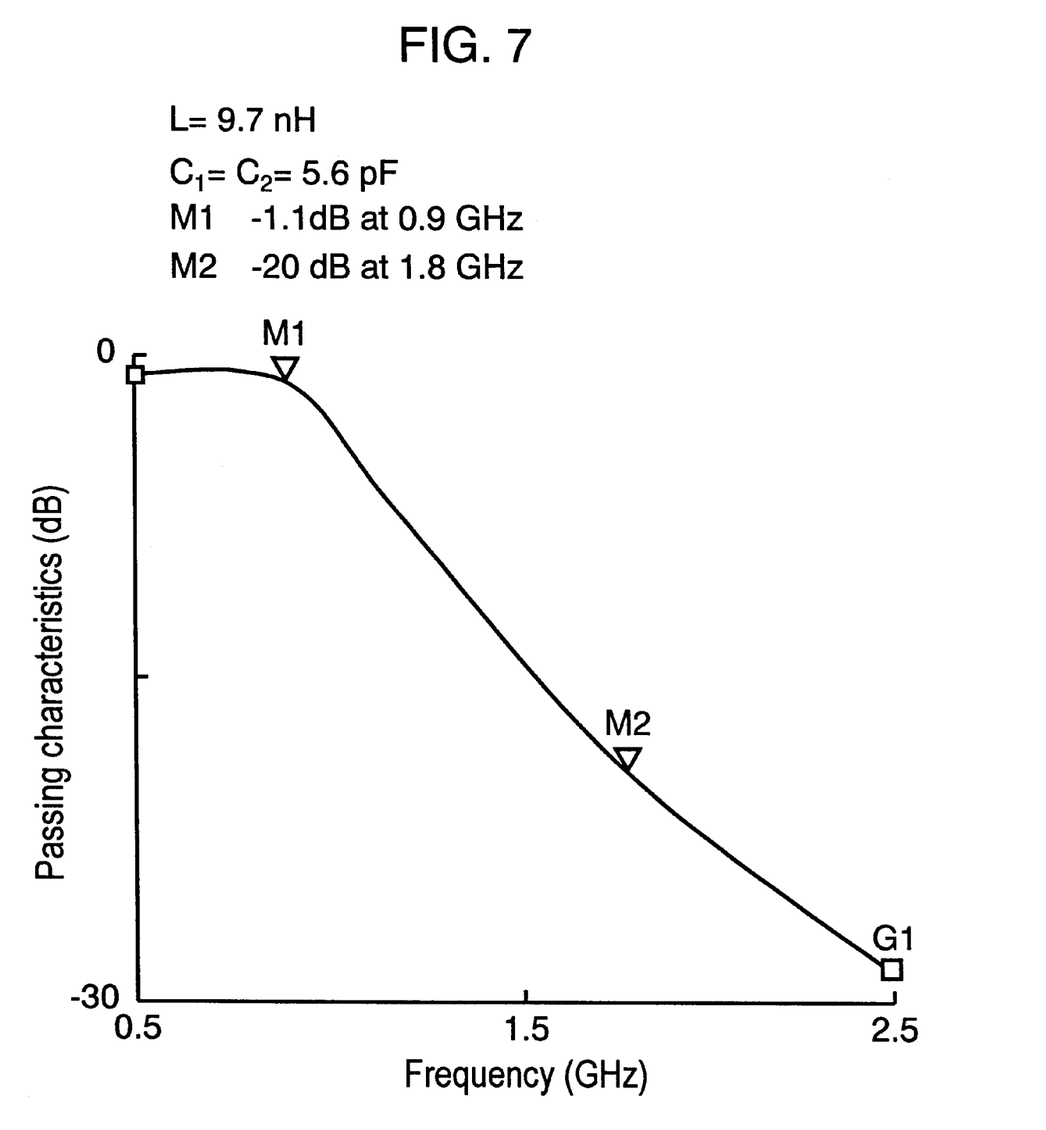
FIG. 7 is an electrical characteristic figure of the same multilayer LC composite component.

Shown in FIG. 7 is a result, as measured with a network analyzer, of a high frequency passing characteristic of the multilayer LC composite component (i.e. low-pass filter) of this exemplary embodiment produced as above. As is apparent from FIG. 7, this achieved production of the low-pass filter having excellent electric characteristics as an insertion loss of −1.1 dB at 0.9 GHz, and an attenuation ratio of −20 dB at 1.8 GHz.

To produce a multilayer LC composite component using copper as an internal electrode, oxidized copper paste may be used in the above process for the electrode paste, after burning off the binder it is reduced to metal copper by a heat treatment in hydrogen, followed by firing in an atmosphere of nitrogen.

In the explanation of the exemplary embodiment of the present invention, although description was given in detail about the multilayer LC composite component, the present invention is by no means limited to it. The present invention provides like effects as those of the multilayer LC composite component, even when it is applied to ordinary electronic components. In addition, since the glass-ceramic composition of the present invention has a large flexural strength and a moderate coefficient of thermal expansion, it is needless to note that the invention is useful for other applications beside those described above.

As has been described, the present invention can provide multilayer LC composite components that are outstanding in mounting reliability particularly to a resin substrate since they have a large flexural strength and a moderate coefficient of thermal expansion, easy to manufacture because the boric oxide content in glass powder is reduced, and have excellent electric characteristics especially at high frequency since they use silver or copper having high electrical conductivity for the internal electrodes.

What is claimed is:

1. A glass-ceramic composition, said glass ceramic composition obtained by forming and firing a first mixture consisting essentially of a glass composite powder and $Mg_2SiO_4$, wherein the first mixture consists essentially of:
   a) 55 to 65 wt. %, based on the total weight the glass composite powder and $Mg_2SiO_4$ in the first mixture, of the glass composite powder;
      in which the glass composite powder is obtained by forming and firing a second mixture, the second mixture consisting essentially of: 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$, based on the total weight of $SiO_2$, BaO, $Al_2O_3$, $La_2O_3$, and $B_2O_3$ in the second mixture; and
   b) 45 to 35 wt. %, based on the total weight the glass composite powder and $Mg_2SiO_4$ in the first mixture, of $Mg_2SiO_4$, and in which said glass ceramic composition has a thermal expansion coefficient of 9 ppm/K or greater and a flexural strength of 150 MPa or greater.

2. The glass-ceramic composition of claim 1 wherein the first mixture is fired at a temperature of 840 degrees C. to 940 degrees C.

3. A glass-ceramic composition, said glass-ceramic composition obtained by forming and firing a first mixture consisting essentially of a glass composite powder, oxidized copper, and $Mg_2SiO_4$, wherein the first mixture consists essentially of:
   a) 50 to 65 wt. %, based on the total weight the glass composite powder and $Mg_2SiO_4$ in the first mixture, of the glass composite powder,
      in which the glass composite powder is obtained by forming and firing a second mixture, the second mixture consisting essentially of: 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$, based on the total weight of $SiO_2$, BaO, $Al_2O_3$, $La_2O_3$, and $B_2O_3$ in the second mixture;
   b) 35 to 50 wt. %, based on the total weight the glass composite powder and $Mg_2SiO_4$ in the first mixture, of $Mg_2SiO_4$; and
   c) 0.2 to 5 wt. %, based on the total weight the glass composite powder and $Mg_2SiO_4$ in the first mixture, of the oxidized copper, calculated as copper oxide, and
      in which said glass ceramic composition has a thermal expansion coefficient of 9 ppm/K or greater and a flexural strength of 150 MPa or greater.

4. The glass-ceramic composition of claim 3 in which the first mixture is fired at a temperature of 840 degrees C. to 940 degrees C.

5. An electronic component comprising:
   a glass-ceramic composition having a thermal expansion coefficient of 9 ppm/K or greater and a flexural strength of 150 MPa or greater obtained by forming and firing a first mixture consisting essentially of a glass composite powder and $Mg_2SiO_4$, wherein the first mixture consists essentially of:
   a) 55 to 65 wt. %, based on the total weight the glass composite powder and $Mg_2SiO_4$ in the first mixture, of the glass composite powder;
      in which the glass composite powder is obtained by forming and firing a second mixture, the second mixture consisting essentially of: 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$, based on the total weight of $SiO_2$, BaO, $Al_2O_3$, $La_2O_3$, and $B_2O_3$ in the second mixture; and
   b) 45 to 35 wt. %, based on the total weight the glass composite powder and $Mg_2SiO_4$ in the first mixture, of $Mg_2SiO_4$; and
      internal electrodes within the glass-ceramic composition, the internal electrodes comprising at least one metal selected from the group consisting of gold, silver, and copper as the main component thereof.

6. The electronic component of claim 4 wherein at least one of the internal electrodes comprises a coil element, said coil element having a liner shape, a meander shape, or a spiral shape.

7. The electronic component of claim 6 wherein the coil element comprises a capacitor element, the capacitor element formed with other internal electrodes confronting with each other across an insulator layer comprising said glass-ceramic composition.

8. An electronic component comprising:
   a glass-ceramic composition having a thermal expansion coefficient of 9 ppm/K or greater and a flexural strength of 150 MPa or greater obtained by forming and firing a first mixture consisting essentially of a glass composite powder, oxidized copper, and $Mg_2SiO_4$, wherein the first mixture consists essentially of:
   a) 50 to 65 wt. %, based on the total weight the glass composite powder and $Mg_2SiO_4$ in the first mixture, of the glass composite powder,
      in which the glass composite powder is obtained by forming and firing a second mixture, the second mixture consisting essentially of: 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$, based on the total weight of $SiO_2$, BaO, $Al_2O_3$, $La_2O_3$, and $B_2O_3$ in the second mixture;
   b) 35 to 50 wt. %, based on the total weight the glass composite powder and $Mg_2SiO_4$ in the first mixture, of $Mg_2SiO_4$; and
   c) 0.2 to 5 wt. %, based on the total weight the glass composite powder and $Mg_2SiO_4$ in the first mixture, of the oxidized copper, calculated as copper oxide;
      internal electrodes within the glass-ceramic composition, the internal electrodes comprising at least one metal selected from the group consisting of gold, silver, and copper as the main component thereof.

9. The electronic component of claim 8 wherein at least one of said internal electrodes comprises a coil element, said coil element having a liner shape, a meander shape, or a spiral shape.

10. The electronic component of claim 9 wherein the coil element comprises a capacitor element, the capacitor element formed with other internal electrodes confronting with each other across an insulator layer comprising said glass-ceramic composition.

11. A multilayer LC composite component comprising:
   an insulator layer comprising a glass-ceramic composition having a thermal expansion coefficient of 9 ppm/K or greater and a flexural strength of 150 MPa or greater;
   an internal electrodes comprising silver or copper as a main component within said insulator layer;
   a coil element within said insulator layer, said coil element consisting of at least one of said internal electrodes, and said coil element and having a liner shape, a meander shape, or a spiral shape;
   a capacitor element comprising said internal electrodes confronting with each other across said insulator layer;
   wherein said glass-ceramic composition is obtained by forming and firing a first mixture consisting essentially of a glass composite powder and $Mg_2SiO_4$, wherein the first mixture consists essentially of:
   a) 55 to 65 wt. %, based on the total weight the glass composite powder and $Mg_2SiO_4$ in the first mixture, of the glass composite powder;
      in which the glass composite powder is obtained by forming and firing a second mixture, the second mixture consisting essentially of: 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$, based on the total weight of $SiO_2$, BaO, $Al_2O_3$, $La_2O_3$, and $B_2O_3$ in the second mixture; and
   b) 45 to 35 wt. %, based on the total weight the glass composite powder and $Mg_2SiO_4$ in the first mixture, of $Mg_2SiO_4$.

12. A multilayer LC composite component comprising:

an insulator layer comprising a glass-ceramic composition having a thermal expansion coefficient of 9 ppm/K or greater and a flexural strength of 150 MPa or greater;

an internal electrodes comprising silver or copper as a main component within said insulator layer;

a coil element within said insulator layer, said coil element consisting of at least one of said internal electrodes, and said coil element and having a liner shape, a meander shape, or a spiral shape;

a capacitor element comprising said internal electrodes confronting with each other across said insulator layer;

wherein said glass-ceramic composition is obtained by forming and firing a first mixture consisting essentially of a glass composite powder, oxidized copper, and $Mg_2SiO_4$, wherein the first mixture consists essentially of:

a) 50 to 65 wt. %, based on the total weight the glass composite powder and $Mg_2SiO_4$ in the first mixture, of the glass composite powder, in which the glass composite powder is obtained by forming and firing a second mixture, the second mixture consisting essentially of: 40 to 50 wt. % of $SiO_2$, 30 to 40 wt. % of BaO, 3 to 8 wt. % of $Al_2O_3$, 8 to 12 wt. % of $La_2O_3$, and 3 to 6 wt. % of $B_2O_3$, based on the total weight of $SiO_2$, BaO, $Al_2O_3$, $La_2O_3$, and $B_2O_3$ in second mixture;

b) 35 to 50 wt. %, based on the total weight the glass composite powder and $Mg_2SiO_4$ in the first mixture, of $Mg_2SiO_4$; and c) 0.2 to 5 wt. %, based on the total weight the glass composite powder and $Mg_2SiO_4$ in the first mixture, of the oxidized copper, calculated as copper oxide.

* * * * *

UNITED STATES PATENT AND TRADEMARK OFFICE
CERTIFICATE OF CORRECTION

PATENT NO. : 6,623,845 B1
DATED : September 23, 2003
INVENTOR(S) : Hidenori Katsumura et al.

It is certified that error appears in the above-identified patent and that said Letters Patent is hereby corrected as shown below:

Column 9,
Line 59, "4" should read -- 5 --

Column 10,
Line 24, before the word "internal" insert -- and --

Column 12,
Line 10, before the word "second" insert -- the --

Signed and Sealed this

Thirtieth Day of March, 2004

JON W. DUDAS
*Acting Director of the United States Patent and Trademark Office*